L. B. MILLER & P. DIEHL.
Band-Wheel Bearings for Sewing-Machines.
No. 224,710.      Patented Feb. 17, 1880.
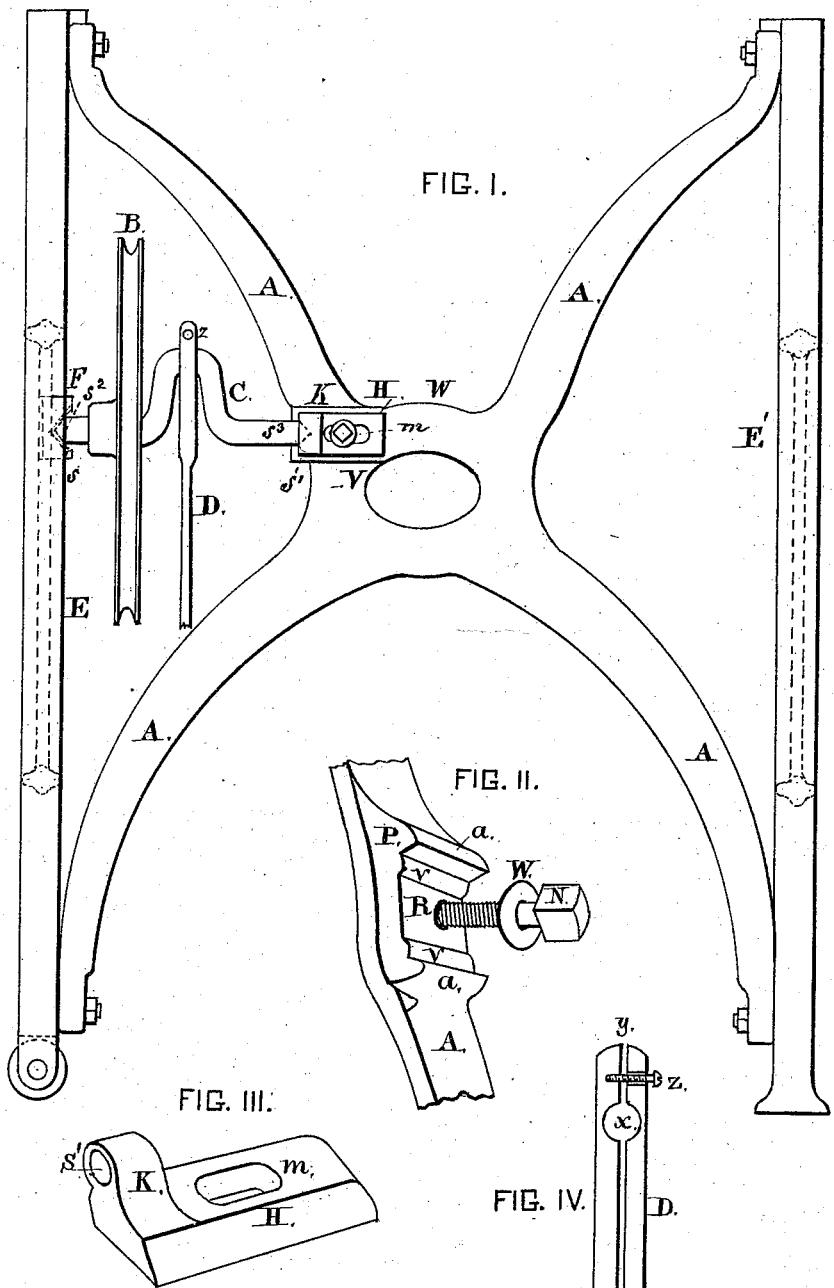
WITNESSES:
D. Ballauf
Emil Wagner
INVENTORS
Lebbeus Baldwin Miller
Philip Diehl
by their attorney
Sydney A. Bennett

UNITED STATES PATENT OFFICE.

LEBBEUS B. MILLER AND PHILIP DIEHL, OF ELIZABETH, N. J., ASSIGNORS TO THE SINGER MANUFACTURING COMPANY OF NEW JERSEY.

BAND-WHEEL BEARING FOR SEWING-MACHINES.

SPECIFICATION forming part of Letters Patent No. 224,710; dated February 17, 1880.

Application filed August 7, 1879.

*To all whom it may concern:*

Be it known that we, LEBBEUS BALDWIN MILLER and PHILIP DIEHL, both of Elizabeth, in the county of Union and State of New Jersey, have invented a new and useful Improvement in Band-Wheel Bearings for Sewing-Machines, of which the following is a specification, reference being made to the accompanying drawings, in which—

Figure I is a plan of the whole of the central brace united to the side pieces E E' of the frame, and also showing a plan of the band-wheel, crank, and attachments connected therewith, the inner end of the crank being supported in the lug H, attached to the central brace, A, which is made in one piece only, as represented, and operates to strengthen and support the frame, connecting it firmly together as a whole, independent of the table or of any other part or connection whatever. Fig. II is a perspective view of a part of the central brace, showing the plan of its construction to receive the adjustable bearing for one end of the crank. Fig. III is a perspective view of the adjustable lug or bearing, a plan of which is shown at H in Fig. I, connected with the central brace. Fig. IV is a section of the crank end of the pitman.

The object of our invention is to do away with the rattling of the band-wheel and to reduce the friction, also to simplify and condense the parts, lessening the cost, and avoiding the complications of the anti-rattling journals in use.

The crank is formed of a round piece of metal, and the bent portion is shaped in a regular and easy curve, so that the pitman, having the orifice $x$ for the crank and the slit $y$, as shown in Fig. IV, will spring open sufficiently to permit the pitman to be slid over and along the easy curves of the crank to the bearing at the center, which is shouldered, as shown, to receive it, and the pitman is there clasped and retained in position by means of the screw $z$.

In the drawings, A A A A, Fig. I, is the central brace, and A, Fig. II, is that portion of the central brace adapted as the bearing for the inner end of the crank, which rests at that end upon the entire central brace, A, and is supported thereby, as shown in Fig. I. B is the band-wheel; C, the crank; D, the pitman; and E the side frame, upon which is the lug F, Fig. I, to support the outer end of the crank. A projection, P, is cast upon the brace A, Fig. II, having the recess R, ribs $a\ a$, and slides $v\ v$, to receive the adjustable lug or bearing H, Fig. III, which is planned to fit between the ribs $a\ a$, to prevent its sagging, and rests on the slides $v\ v$, being retained in position by the washer W and bolt N, the bolt passing through the slot $m$ in H to the brace A, which is tapped to receive it, as shown in Fig. II. The adjustable lug or bearing H is shown in appropriate position upon the central brace, A, in Fig. I.

The ends of the crank $s^2\ s^3$, Fig. I, are conical, and the recess $s$ in the bearing F, Fig. I, and the recess $s'$ in the lug or bearing H, Figs. I and III, are also conical, to receive the crank, as shown.

On band-wheels as formerly constructed, having a bearing on a stud, the pitman was applied outside the bearing, causing a side or jamming movement and excessive wear and lost motion. In our improvement the power is applied at the center, and the pressure is always directly upon the bearings, so that there is no tendency to a side or jamming motion, and the friction and wear are consequently reduced to the least amount. The crank is supported at one end by the central brace, and at the other end by one of the side pieces of the frame.

By this arrangement a great advantage is obtained, as the crank presses down in direct line both upon the side of the frame and upon the central brace, thereby equalizing and distributing the weight throughout the entire frame without any lateral pressure whatever or any tendency to sag or break the side piece E, or to rack the frame when the machine is in operation. The crank also is thus very much shorter than if extended the whole length of the frame, as formerly, and the cost, friction, and wear are proportionally reduced. The bearings also being conical instead of straight, the end play of the crank is prevented, and an adjustment for wear and lost motion may be readily made by means of a set-screw on the central brace or on the side piece, or on both the central brace and the side piece, or by the use of an adjustable lug or bearing upon the central brace or the side piece, substantially as at H, Fig. I.

What we claim is—

1. In the frame of a sewing-machine, the central brace, A, as a support or bearing for one end of the crank C, operating either in direct contact with the said central brace, A, or connected therewith by means of an adjustable lug or bearing, substantially in the manner and for the purposes described.

2. In the frame of a sewing-machine, the crank C, having the conical bearings $s$ $s'$ $s^2$ $s^3$, in combination with an adjustable lug or bearing on the central brace, A, or on the side piece, E, substantially in the manner and for the purposes described.

3. The combination of the adjustable lug or bearing H, Fig. III, having the slot $m$, projection K, and recess $s'$, with the central brace, A, substantially in the manner and for the purposes described.

4. The adjustable lug or bearing H, in combination with the recess R, projection P, slides $v$ $v$, and ribs $a$ $a$, substantially in the manner and for the purposes described.

5. The combination of the crank C, band-wheel B, pitman D, adjustable lug or bearing H, projection P, slides $v$ $v$, ribs $a$ $a$, and bolt N, substantially in the manner and for the purposes described.

LEBBEUS BALDWIN MILLER.
PHILIP DIEHL.

Witnesses:
E. H. BENNETT,
DANIEL F. TOMPKINS.